(12) United States Patent
Takeuchi

(10) Patent No.: US 8,021,893 B2
(45) Date of Patent: Sep. 20, 2011

(54) MOLECULAR RECOGNITION POLYMER ENABLING RECONSTRUCTION OF RECOGNITION FIELD FOR TARGET MOLECULE AND METHOD OF PRODUCING THE SAME

(75) Inventor: Toshifumi Takeuchi, Kobe (JP)

(73) Assignee: Japan Science and Technology Agency, Saitama (JP)

(*) Notice: Subject to any disclaimer, the term of this patent is extended or adjusted under 35 U.S.C. 154(b) by 600 days.

(21) Appl. No.: 11/579,602

(22) PCT Filed: May 6, 2005

(86) PCT No.: PCT/JP2005/008351
§ 371 (c)(1),
(2), (4) Date: Sep. 30, 2008

(87) PCT Pub. No.: WO2005/108443
PCT Pub. Date: Nov. 17, 2005

(65) Prior Publication Data
US 2009/0053825 A1    Feb. 26, 2009

(30) Foreign Application Priority Data
May 7, 2004  (JP) .................. 2004-139046

(51) Int. Cl.
*C08F 212/08* (2006.01)
*C08F 220/34* (2006.01)
(52) U.S. Cl. .......... 436/501; 422/91; 422/88; 422/68.1; 436/43; 436/164; 436/166
(58) Field of Classification Search .......... None
See application file for complete search history.

(56) References Cited

U.S. PATENT DOCUMENTS
6,749,811 B2 * 6/2004 Murray .................. 422/91
(Continued)

FOREIGN PATENT DOCUMENTS
JP    11-255948    9/1999
(Continued)

OTHER PUBLICATIONS
International Search Report, (PCT/ISA/210), PCT/JP2005/008351, Aug. 2, 2005.
Kamachi, Mikiharu, et al. *Radical Polymerization Handbook*. NTS Inc, 1999. (p. 645-654).
(Continued)

*Primary Examiner* — Mark Shibuya
*Assistant Examiner* — Galina Yakovleva
(74) *Attorney, Agent, or Firm* — Harness, Dickey & Pierce, P.L.C.

(57) ABSTRACT

A molecular recognition polymer enabling the reconstruction of the recognition field for a target molecule which is produced by applying the molecular imprinting method is disclosed. A molecular recognition polymer enabling the reconstruction of the recognition field for a target molecule which has a molecule interacting with the target molecule in the polymer and in which the recognition field for a target molecule has been constructed and the above-described molecule interacting with the target molecule is detachable and replaceable. This molecular recognition polymer can be produced by synthesizing a complex of the target molecule with a molecule capable of specifically and reversibly binding to the target molecule, copolymerizing this complex with a molecule interacting with the target molecule and a crosslinking agent to give a polymer, and then detaching the target molecule and the molecule interacting with the target molecule from the polymer thus obtained.

10 Claims, 6 Drawing Sheets

U.S. PATENT DOCUMENTS

2003/0129092 A1* 7/2003 Murray ............... 422/82.07

FOREIGN PATENT DOCUMENTS

| JP | 2000-107597 | 4/2000 |
|----|-------------|--------|
| JP | 2000-356639 | 12/2000 |
| JP | 2003-73419 | 3/2003 |
| JP | 2004-347316 | 12/2004 |
| JP | 2005-114644 | 4/2005 |
| WO | WO 01/77664 | 10/2001 |
| WO | 03/034043 | 4/2003 |

OTHER PUBLICATIONS

Matsui, Jun, et al. "Molecularly Imprinted Polymer as 9-Ethyladenine Receptor Having a Porphyrin-Based Recognition Center." *Journal of the American Chemical Society*, vol. 122, No. 21 (2000). p. 5218-5219.

Takeuchi, Toshifumi, et al. "Molecularly Imprinted Polymers with Metalloporphyrin-Based Molecular Recognition Sites Coassembled with Methacrylic Acid." *Analytical Chemistry*, vol. 73, No. 16 (2001). p. 3869-3874.

European Search Report dated Nov. 18, 2008 in corresponding European Application No. 05736818.5.

A. Seko et al., Nippon Kagakkai Koen Yokoshu-Chemical Society of Japan, vol. 81, No. 2, p. 834 (2002).

D. Cunliffe et al., European Polymer Journal, vol. 40, No. 1, pp. 5-25 (Jan. 1, 2004).

A. Tong et al., Analytica Chimica Acta, vol. 466, No. 1, pp. 31-37 (Aug. 21, 2002).

* cited by examiner

MOLECULAR RECOGNITION POLYMER ENABLING RECONSTRUCTION OF RECOGNITION FIELD FOR TARGET MOLECULE AND METHOD OF PRODUCING THE SAME

TECHNICAL FIELD

The present invention relates to a molecular recognition polymer with a reconstructable recognition field for a target molecule, and a producing method of such molecular recognition polymer.

BACKGROUND ART

The biological system includes a wide diversity of chemical species. The biological system sustains its activity by the systematic and ordered interactions or chemical reactions of these chemical species. The order is maintained by the molecular recognition functions of the molecules in the system. Such molecular recognition functions are considered to be the minimum required functions of the biologically functional molecules. In the body, the molecular recognition functions combine together in a highly sophisticated manner to exhibit various specific functions. There have been attempts to mimic these superior functions of the biological system for actual application. One example is the creation of artificial receptors, which have been actively researched and developed as novel functional material.

A molecular imprinting method is a technique that has caught attention these days as a method of synthesis of artificial receptors that can specifically recognize target molecules (see Non-Patent Publication 1). The molecular imprinting method is the technique whereby the shape of a molecule to be recognized (target molecule) is imprinted (impressed) in the polymer, and the resulting cavity (target-molecule recognition field) is used for molecular recognition. First, the target molecule is complexed with a molecule (functional monomer) that includes (i) a functional group(s) that specifically interacts with the target molecule, and (ii) a functional group, such as a vinyl group, that can polymerize with a cross linker. This is followed by radical polymerization with a cross linker. The target molecule is then removed from the polymer, and as a result binding sites complementary to the target molecule are constructed in the polymer. The resulting polymer is called a molecularly imprinted polymer.

The success or failure of obtaining a desirable molecular recognition function depends on how precisely the selective cavity (target-molecule recognition field) is constructed in the polymer. This is greatly influenced by the design of interaction patterns between the target molecule and the functional monomer. The patterns of interactions can be broadly classified into a non-covalent bonding type and a covalent bonding type. In the former, a target molecule and a functional monomer are complexed in a pre-polymerization mixture by non-covalent bonding such as hydrogen bonding or electrostatic interactions. In the latter, the complex is synthesized and isolated prior to polymerization with a cross-linker. These methods are selected according to the chemical properties of the target molecule, so that the optimum effect can be obtained. In the molecular imprinting method, the construction of the binding site by the functional monomer and the crosslinking monomer proceeds from the target molecule. This optimizes the binding site in terms of entropy, and enables the molecular recognition field to be tailored.

The molecular recognition polymer is highly useful as a sensing element when it has a sensing molecule that exhibits a signaling capability upon binding of its binding site (functional monomer) to the target molecule. For example, the inventor of the present invention has developed a molecularly imprinted polymer capable of sensing quenching of fluorescence that results from target binding, wherein a porphyrin-zinc complex was used as the functional monomer, and cinchonidine, which can be axially positioned to the functional monomer was used as the target molecule (see Non-Patent Publication 2).

Non-Patent Publication 1

*Radical Polymerization Handbook*, Mikiharu KAMACHI, Tsuyoshi ENDO, 1999, NTS Inc.

Non-Patent Publication 2

Matsui, J., Higashi, M., Takeuchi, T. Molecularly Imprinted Polymer as 9-Ethyladenine Receptor Having a Porphyrin-based Recognition Center, J. Am. Chem. Soc. 2000, 122, 5218-5219.

As described above, designing and synthesis of artificial receptors having molecular recognition functions are important fields of research in biomimetics. To this date, a wide diversity of host molecules has been synthesized. However, practically no artificial receptors are known that can exhibit functions to the level of sophistication displayed by natural receptors in the biological system. This is because the mechanism of displaying functions in the biological system involves many different stages of molecular recognition functions.

In the biological system, a complete function is displayed in the presence of target molecules and many assisting and support systems for reading information produced by the receptors that have recognized the molecules. If such biological system were constructed artificially, it would be possible to understand the complex living phenomena in terms of intermolecular interactions and provide general understanding of such living phenomena. This will lead to more thorough and correct understanding of living phenomena and provide applications based on such understanding.

The present invention was made in view of the foregoing problems, and an object of the present invention is to provide a molecular recognition polymer that can reconstruct its recognition field for a target molecule and thereby displays a function (specific recognition of a target molecule) in the presence of plural molecules. The invention also provides a producing method of such molecular recognition polymer.

DISCLOSURE OF INVENTION

The inventor of the present invention postulated that an artificial receptor that can display its function (specific recognition of a target molecule) in the presence of plural molecules could be produced by a system in which a recognition field for a target molecule can be reconstructed after it has been destroyed. The inventor diligently worked to realize such system and found that a molecular recognition polymer that can reconstruct a target field for the target molecule could be produced by a molecular imprinting method. The present invention was made based on this finding.

Specifically, according to the present invention, there is provided a molecular recognition polymer which includes (a) a molecule that specifically and reversibly binds to a target molecule, and (b) a molecule that interacts with the target molecule, wherein the molecular recognition polymer includes a target-molecule recognition field complementary to the target molecule, and wherein the molecule (b) that interacts with the target molecule is detachable or replaceable. In this way, a molecular recognition polymer can be realized that can reconstruct a target-molecule recognition field.

It is preferable that the molecule (b) that interacts with the target molecule exhibit a signaling capability by interacting with the target molecule. In this way, a state of binding between the molecular recognition polymer and the target molecule can easily be detected. Further, by replacing the molecule having a signaling capability, molecular recognition polymers with different functions can easily be produced.

It is preferable that the molecule (a) that specifically and reversibly binds to the target molecule have a functional group for forming a covalent bond with the target molecule to prepare a complex covalently joined to the target molecule. By synthesizing the polymer using the complex as a template, the target-molecule recognition field can be stably maintained.

A molecular recognition polymer according to the present invention can bind to the target molecule when the target molecule coexists with the molecule (b) that interacts with the target molecule. It is preferable that at least one of the target molecule and the molecule (b) that interacts with the target molecule be a bio-molecule. This allows for accurate analysis of intermolecular interactions, which in turn enables analysis of complex intermolecular interactions in the biological system. The molecule (b) that interacts with the target molecule may be a porphyrin or a porphyrin complex.

According to the present invention, there is provided a method for producing a molecular recognition polymer, the method including: a complex synthesizing step of complexing the target molecule with a molecule (a) having a functional group that specifically and reversibly binds to the target molecule; a polymerizing step of forming a polymer by co-polymerizing the complex with the molecule (b) that interacts with the target molecule, using a cross-linker; and a detaching step of detaching, from the polymer, the target molecule and the molecule (b) that interacts with the target molecule. The method can be used to produce a molecular recognition polymer according to the present invention.

Additional objects, features, and strengths of the present invention will be made clear by the description below. Further, the advantages of the present invention will be evident from the following explanation in reference to the drawings.

BEST MODE FOR CARRYING OUT THE INVENTION

Figure 1:
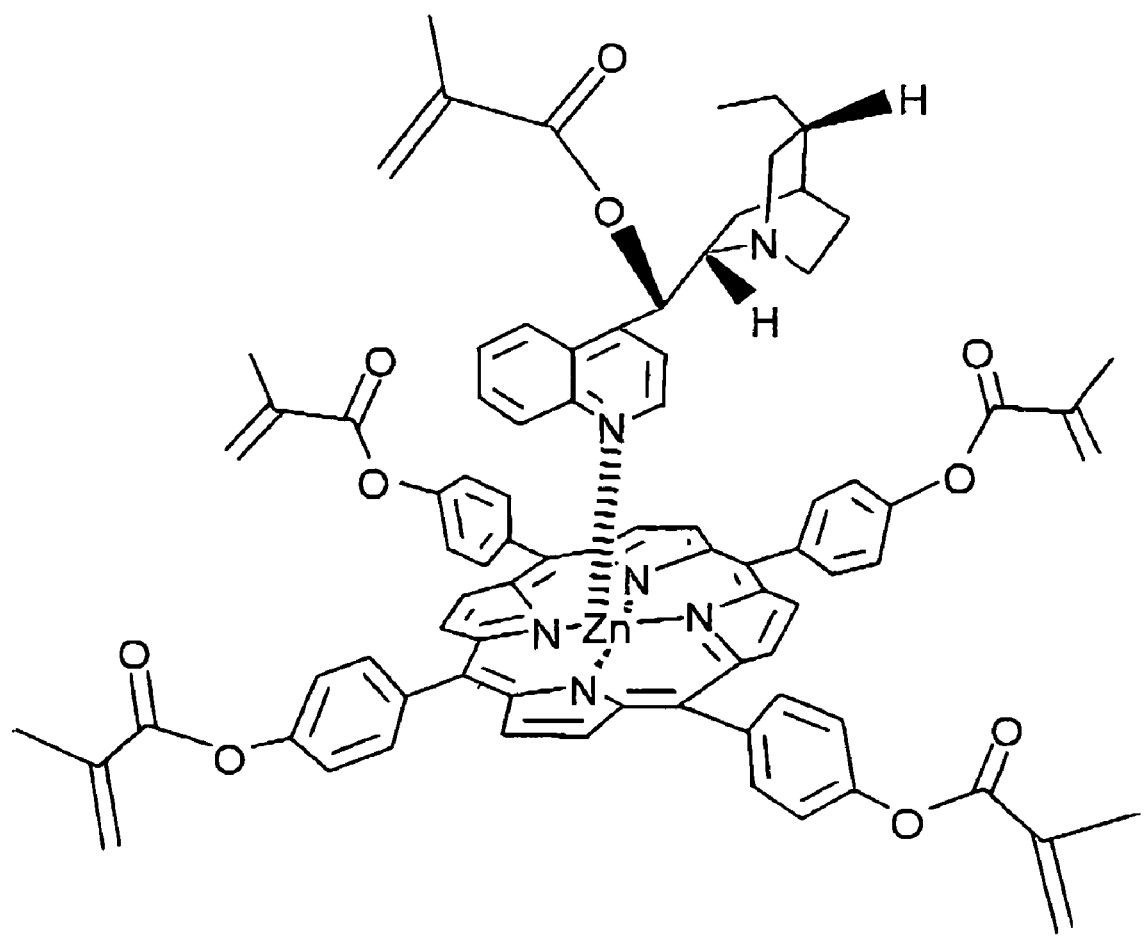
FIG. 1 is a diagram showing interactions between a cinchonidine-methacrylic acid complex and a porphyrin-zinc complex.

The following will describe one embodiment of the present invention. It should be appreciated that the present invention is not limited in any way by the following description.

[Molecular Recognition Polymer]

A molecular recognition polymer according to the present invention includes a molecule (a) that specifically and reversibly binds to a target molecule, and a molecule (b) that interacts with the target molecule. In the molecular recognition polymer, a target-molecule recognition field is formed that is complementary to the target molecule, and the molecule (b) that interacts with the target molecule is detachable or replaceable.

The molecule (a) that specifically and reversibly binds to the target molecule is not particularly limited as long as it has (i) a functional group that can specifically and reversibly bind to the target molecule, and (ii) a functional group that is polymerizable. The specific and reversible bonding may be made by either a non-covalent bond or a covalent bond. The non-covalent bond may be made by, for example, hydrogen bonding between a hydrogen donating group (a hydrogen atom of an amide group, a hydrogen atom of a carboxyl group; an amino group; a hydroxy group; a phenolic hydroxy group, etc.) and a hydrogen accepting group (a carbonyl group of an amide group; a carbonyl moiety of a carboxyl group; nitrogen atoms of a nitrogen-containing heterocyclic ring such as a pyridine ring, etc.); or ion bonding (electrostatic interaction between positively charged and negatively charged ions). The covalent bond may be made by, for example, an ester bond between a boronic acid group and cis-diol; an acetal bond between aldehyde and a hydroxy group; a ketal bond between ketone and a hydroxy group; a coordination bond using a metal complex (for example, zinc porphyrin), and a Schiff base formed by the bonding of aldehyde and an amino group; an ester bond between a carboxyl group and a hydroxy group; or an amide bond between a carboxyl group and an amino group.

The molecule (b) that interacts with the target molecule is not particularly limited as long as it can be detached from the polymer in a producing step of the molecular recognition polymer, as will be described later. As such, the molecule (b) that interacts with the target molecule can be suitably selected according to the type of target molecule. The target molecule is not particularly limited either, and can be suitably selected for different purposes. For example, the target molecule may be a bio-substance, a drug, or an environmentally harmful substance. In this way, an industrially useful molecular recognition polymer can be realized.

The target-molecule recognition field complementary to the target molecule is a space in the molecular recognition polymer where the target molecule is recognized. The target-molecule recognition field is formed in the molecular recognition polymer by the molecule (a) that specifically and reversibly binds to the target molecule and by the molecule (b) that interacts with the target molecule. With these molecules stably forming a space (target-molecule recognition field) highly complementary to the target molecule, a molecular recognition polymer can be realized that can accurately recognize the target molecule.

A characteristic feature of a molecular recognition polymer according to the present invention is that the molecule (b) that interacts with the target molecule is detachable or replaceable. As used herein, "detachable" means that the molecule (b) that interacts with the target molecule in the molecular recognition polymer is once removed from the molecular recognition polymer, and then attached (bound) again to the molecular recognition polymer (reconstruction). It should be noted here that the molecule to be re-attached is not necessarily required to be the same molecule that was detached from the molecular recognition polymer, as long as it is the same molecular species. As used herein, "replaceable" means that the molecule (b) that interacts with the target molecule in the molecular recognition polymer is once detached from the molecular recognition polymer, and later a molecule, for example, with a similar structure or modified structure is attached (bound) again to the molecular recognition polymer.

It is preferable that the molecule (b) that interacts with the target molecule exhibit a signaling capability by interacting with the target molecule. As used herein, "signaling capability" refers to, but is not particularly limited to, the ability to detect changes in the property or structure of the target molecule caused by interactions with the target molecule. Specifically, the signal may be, for example, electrochemical information, spectroscopic information, or information based on catalytic activity. When a molecule capable of sending an electrochemical signal is used, interaction with the molecular recognition polymer and the target molecule can be detected with, for example, an electrochemical detecting means used in combination with electrodes. When a molecule capable of sending a spectroscopic signal is used, interaction with the molecular recognition polymer and the target molecule can be detected by, for example, optical sensing using an optical fiber. When a molecule capable of sending a signal concerning catalytic activity is used, interaction with the molecular recognition polymer and the target molecule can be detected, for example, by detecting a product of a catalytic reaction with electrochemical or spectroscopic detecting means. As described above, the usefulness of the molecular recognition polymer can be improved greatly when it has a molecule that exhibits a signaling capability by interacting with the target molecule, because the molecule easily allows for detection of the interaction between the molecular recognition polymer and the target molecule.

The molecule (b) having a signaling capability by interacting with the target molecule is replaceable. This enables a single molecular recognition polymer to exhibit different functions simply by once constructing a molecular recognition polymer with a molecule that exhibits a signaling activity by interacting with a specific target molecule, and then replacing this molecule with another signaling molecule. Further, in the event where the signaling function of the molecule has degraded due to use, the function can be restored by replacing the molecule. For example, such degradation occurs when a molecule that emits fluorescence by interacting with the target molecule loses some of its fluorescence activity.

It is preferable that the molecule (a) that specifically and reversibly binds to the target molecule be bound to the target molecule by reversible covalent bonding. In other words, the molecule (a) that specifically and reversibly binds to the target molecule preferably includes a covalent bond-forming functional group that can specifically and reversibly form a covalent bond with the target molecule.

A molecular recognition polymer according to the present invention can be produced by a molecular imprinting method, as will be described later in the Producing Method section. The molecular imprinting method can be classified into a non-covalent bonding type and a covalent bonding type. In the molecular imprinting method of a non-covalent bonding type, a complex of the target molecule and the functional monomer (a molecule that specifically and reversibly binds to the target molecule) is formed in a polymerization reaction solution by non-covalent bonding such as hydrogen bonding or electrostatic interaction. In the molecular imprinting method of a covalent bonding type, a complex of the target molecule and the functional monomer (a molecule that specifically and reversibly binds to the target molecule) is synthesized and isolated, before it is polymerized with a cross-linker.

The inventor of the present invention synthesized a molecular recognition polymer using cinchonidine (one kind of alkaloid) as the target molecule, methacrylic acid as the molecule (a) that specifically and reversibly binds to the target molecule, and a porphyrin-zinc complex as the molecule (b) that exhibits a signaling capability by interacting with the target molecule. The inventor found that when the molecular imprinting method of a non-covalent bonding type was used for the synthesis and when the porphyrin-zinc complex was once detached and then re-attached to re-construct the molecular recognition field, the molecular recognition polymer showed non-specific binding to cinchonidine due to insufficient activity of the re-constructed recognition field. When the molecular imprinting method of a covalent bonding type was used for the synthesis, the molecular recognition polymer showed less non-specific binding to cinchonidine and an increased level of specificity. It is therefore preferable that the molecule (a) that specifically and reversibly binds to the target molecule have a functional group that can specifically and reversibly form a covalent bond with the target molecule, and that a more stable molecular recognition field can be re-constructed when the polymerization reaction is performed after the complex with the target molecule is formed by covalent bonding.

A characteristic feature of a molecular recognition polymer according to the present invention is that it can bind to the target molecule when the target molecule coexists with the molecule (b) that interacts with the target molecule. For example, consider the case where a molecular recognition polymer lacking the molecule (b) that interacts with the target molecule is added to a solution or the like that contains the target molecule and the molecule (b) that interacts with the target molecule. In this case, the molecule (b) that interacts with the target molecule binds to the target polymer in the solution, and a target-molecule recognition field is re-constructed. The molecular recognition polymer, with its target-molecule recognition field re-constructed, then binds to the target molecule. This allows for more accurate analysis of intermolecular interactions, and thereby enhances the applicable field of a molecular recognition polymer of the present invention.

In a molecular recognition polymer according to the present invention, it is preferable that at least one of the target molecule and the molecule (b) that interacts with the target molecule be a bio-molecule. The type of bio-molecule is not particularly limited as long as it is a molecule found in biological systems. By using a bio-molecule for either one of or both of the target molecule and the molecule (b) that interacts with the target molecule, it would be possible to analyze complex intermolecular interactions in a biological system. In the case where a bio-molecule is used for one of the target molecule and the molecule (b) that interacts with the target molecule, the bio-molecule may be, for example, a molecule that interacts with a drug, such as a medicament, used for the other. As another example, the bio-molecule may be a molecule that interacts with an environmentally harmful substance, such as endocrine disrupter, used for the other. In the case where a bio-molecule is used for both of the target molecule and the molecule (b) that interacts with the target molecule, one of the molecules may be an enzyme while the other is a substrate, or one of the molecules may be a signaling substance such as a hormone while the other is a receptor or the like, for example.

The following is a list of exemplary molecules that can be suitably used for a molecular recognition polymer of the present invention, as the molecule that exhibits a signaling capability by interacting with the target molecule. Azobenzene-type signaling molecules such as methyl orange or methyl red; quinone-type signaling molecule such as naphthoquinone or anthraquinone; diaryl methane or triaryl methane-type signaling molecules such as phenoxazine or malachite green; fluorane-type signaling molecules such as fluorescein or rhodamine B; cyanine-type signaling molecules such as indocyanine or hemicyanine; porphyrin/phthalocyanine-type signaling molecules such as tetraphenyl porphyrin or phthalocyanine; flugide-type signaling molecules such as oxazolyl ethylidene isopropylidene succinic anhydride or aryl fulgenic anhydride; indigo-type signaling molecules such as indigo or thioindigo; condensed ring-type signaling molecules such as anthracene or pyrene; charge transfer-type signaling molecules such as tetrathiafulvalene-tetracyanoquinodimetane; metal complex-type signaling molecules such as metal dithiolene or quinolinol; styryl-type signaling molecules such as stilbene or stylbazole; spiropyrane-type signaling molecules such as spirobenzopyrane or spirooxadine; diarylethene-type signaling molecules such as difurylethene or dithienylethene; squaririum-type signaling molecules such as squaririum or chloconium; fullerene-type signaling molecules such as $C_{60}$ or $C_{70}$; Schiff base-type signaling molecules such as benzylideneaniline, salicylaldehyde semicarbazone; and flavonoid-type signaling molecules such as quercetin or anthocyanin.

A preferable example of the molecule that exhibits a signaling capability by interacting with the target molecule is a porphyrin or a porphyrin complex. A porphyrin is a collective term used to refer to macrocyclic compounds and their derivatives, in which four pyrrole rings are linked on opposite sides (α position) through four methine groups (see Chemical Formula 1).

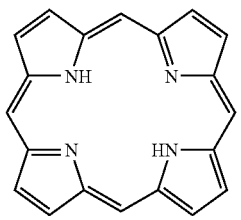

[Chemical Formula 1]

Representative examples of porphyrins include proto porphyrin, etioporphyrin, and mesoporphyrin. The properties of porphyrins, such as absorption spectrum, solubility, and acid dissociation constant differ greatly depending on the substituents. Porphyrins have the following common absorption bands: four strong peaks in the visible range, and a strong peak, known as Soret band, near 400 nm. These are closely associated with the state of π electrons in the conjugate system of the ring, and are responsible for the red purple fluorescence exhibited in inorganic acids or an organic solvent. Non-derivatized porphyrins do not occur in nature, but various types of derivatives have been found in nature, with intermolecular complex salts having incorporated therein iron, copper, or magnesium as the metal center. Many of these porphyrins are physiologically important. For example, hemoglobin, cytochrome, and catalase include hemes or hematins, which are iron porphyrins. The chloroplasts of plants include chlorophylls with magnesium. Porphyrin complexes are a collective term used to refer to metal complexes including porphyrins as ligands.

In the case where the molecule (b) that interacts with the target molecule is a porphyrin or porphyrin complex, the target molecule is not particularly limited as long as it can interact with a porphyrin or porphyrin complex, and it can be suitably selected for different purposes. For example, a molecular recognition polymer with a reconstructable target-molecule recognition field was produced by the inventor of the present invention, wherein a porphyrin-zinc complex was used as the molecule (b) that interacts with the target molecule, and cinchonidine (see Chemical Formula 2), one kind of alkaloid that can be axially positioned with the porphyrin-zinc complex, was used as the target molecule. This will be described in detail in the Example section.

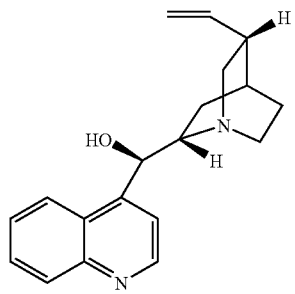

[Chemical Formula 2]

[Producing Method]

A producing method of a molecular recognition polymer according to the present invention at least includes: a complex synthesizing step of complexing a target molecule with a molecule (a) having a functional group that can specifically and reversibly form a covalent bond with the target molecule; a polymerizing step of copolymerizing, using a cross-linker, the complex with a molecule (b) that interacts with the target molecule; and a detaching step of detaching from the polymer the target molecule and the molecule (b) that interacts with the target molecule. A producing method of a molecular recognition polymer according to the present invention may additionally include other steps. As a non-limiting example, a target molecule reducing step may additionally be included, as will be described later.

A producing method of the present invention is an application of the molecular imprinting method. The molecular imprinting method is a method whereby a shape of the molecule to be recognized is imprinted in the polymer, and the resulting cavity (target-molecule recognition field) is used to recognize the molecule. Specifically, using a cross-linker, the target molecule complexed with a molecule (a) that specifically and reversibly binds to the target molecule including (i) a portion that specifically interacts with the target molecule and (ii) a polymerizable functional group such as a vinyl group, is radically polymerized. The target molecule is then removed from the polymer to construct a binding site complementary to the target molecule. As described before, the molecular imprinting method can be classified into a non-covalent bonding type, in which the bonding between the target molecule and the molecule (a) that specifically and reversibly binds to the target molecule is made by a non-covalent bond, and a covalent bonding type, in which the bonding is made by a covalent bond. A producing method according to the present invention employs the molecular imprinting method of a covalent bonding type.

In the complex synthesizing step, a complex is synthesized by forming a covalent bond between the target molecule and a molecule (a) having a functional group that can specifically and reversibly form a covalent bond with the target molecule. The covalent bond may be made by, for example, an ester bond between a boronic acid group and cis-diol; an acetal bond between aldehyde and a hydroxy group; a ketal bond between ketone and a hydroxy group; a ligand bond using a metal complex (for example, zinc porphyrin), and a Schiff base formed by the bonding of aldehyde and an amino group; an ester bond between a carboxyl group and a hydroxy group; or an amide bond between a carboxyl group and an amino group. By synthesizing the complex beforehand with the covalent bond, a molecular recognition polymer can be produced that can more precisely reconstruct the molecular recognition field.

In the polymerizing step, the complex synthesized in the complex synthesizing step is copolymerized with the molecule (b) that interacts with the target molecule and a cross-linker. Specifically, in the polymerizing step, the reagents (the complex, the molecule (b) that interacts with the target molecule, and a polymerizing agent) are dissolved in a solvent, and a copolymerization reaction is performed with a polymerization initiator. Here, the solvent also serves as a pore former for producing a porous polymer. The solvent is not particularly limited as long as it can dissolve the complex, the molecule (b) that interacts with the target molecule, and the polymerizing agent. However, benzene and chloroform are preferable for their ability to desirably dissolve the reagents. As the polymerization initiator, 2,2'-azobis (isobutyronitrile) or 2,2'-azobis (2,4-dimethyl valeronitrile) can be used, for example.

The polymerizing agent is selected from compounds that include a group, such as a vinyl group or a (meth)acryloyl group, that can copolymerize with the polymerizable functional group of the molecule (a) that specifically and reversibly binds to the target molecule. Examples of the cross-linker are represented by Formulae (1) to (20) below.

[Chemical Formula 3]

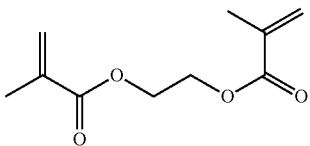

(1)

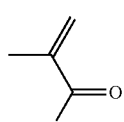

(2)

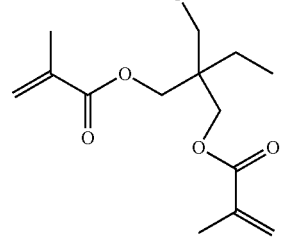

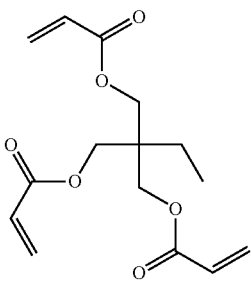

(3)

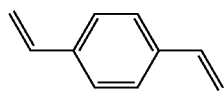

(4)

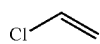

(5)

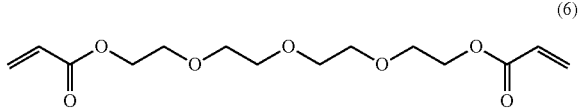

(6)

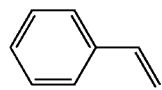

(7)

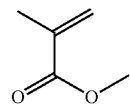

(8)

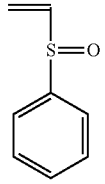

(9)

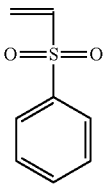

(10)

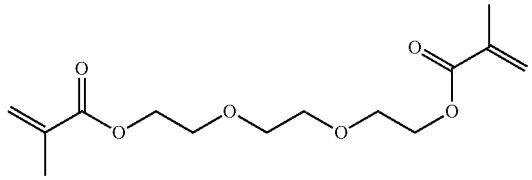

(11)

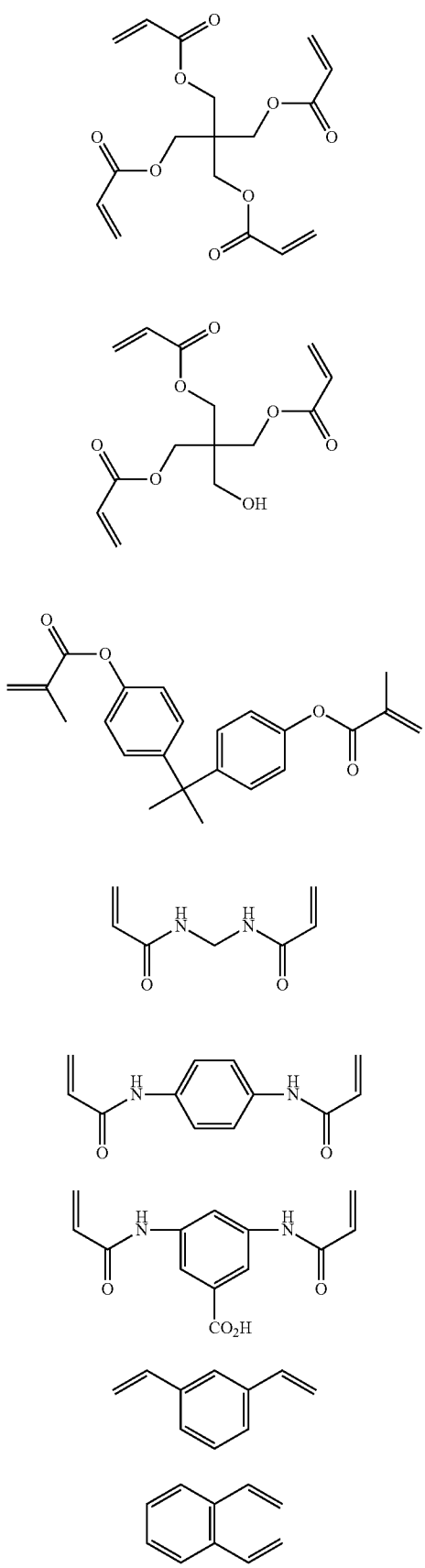
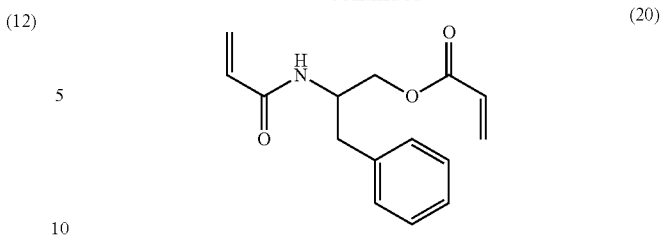

It is preferable that the cross-linker include a plurality of polymerizable groups. Examples of such cross-linker include divinylbenzene cross-linkers such as p-divinylbenzene represented by Formula (4), o-divinylbenzene represented by Formula (18), and m-divinylbenzene represented in Formula (19); and (meth)acrylic acid cross-linkers. Preferable examples of (meth)acrylic acid are compounds with a plurality of (meth)acrylyl groups, for example, such as ethylene glycol methacrylate (EDMA) represented by Formula (1), trimethylolpropane trimethacrylate (TRIM) represented by Formula (2), trimethylolpropane triacrylate represented by Formula (3), tetraethylene glycol diacrylate represented by Formula (6), triethylene glycol dimethacrylate represented by Formula (11), pentaerythritol tetraacrylate represented by Formula (12), pentaerythritol triacrylate represented by Formula (13), bisphenol-A dimethacrylate represented by Formula (14), N,N'-methylenediacrylamide represented by Formula (15), N,N'-1,4-phenylenediacrylamide represented by Formula (16), 3,5-bis(acryloylamide) benzoic acid represented by Formula (17), and N,O-bisacryloyl-L-phenyl alaninol represented by Formula (20). Further, the cross-linker may be a compound with one vinyl group, for example, such as chloroethene represented by Formula (5), styrene represented by Formula (7), phenylvinyl sulfoxide represented by Formula (9), phenylvinyl sulfone represented by Formula (10); or a compound with one (meth)acryloyl group, for example, such as methyl methacrylate represented by Formula (8). It is preferable that the cross-linker include the same polymerizable functional group included in the molecule (a) that specifically and reversibly binds to the target molecule.

In the detaching step, the target molecule is detached from the polymer, together with the molecule (b) that interacts with the target molecule. The detaching method is not particularly limited as long as it breaks the reversible bond binding the polymer, obtained in the polymerizing step, with the target molecule and the molecule (b) that interacts with the target molecule. For example, when the reversible bond is an ester bond, the target molecule can be detached by breaking the ester bond by acid hydrolysis or alkali hydrolysis.

The detachment of the target molecule and the molecule (b) that interacts with the target molecule may be influenced by the extent of crosslinkage of the polymer. Specifically, when the crosslinkage is too strong, the molecules cannot be detached sufficiently. This necessitates the polymer crosslinkage to be suppressed below a certain level. However, when the extent of crosslinkage falls below a certain level, the target-molecule recognition field may become instable. The extent of crosslinkage takes different optimum values depending on the size of the target molecule, the size of the molecule (a) that specifically and reversibly binds to the target molecule, and the size of the molecule (b) that interacts with the target molecule. It is therefore difficult to specify optimum values of crosslinkage. However, it is preferable that the optimum values of crosslinkage be suitably set so that the molar ratio of template molecule (the molecule that interacts with the complex and the target molecule) and the cross-linker is 1:1 to 1:50.

In the case where the target molecule has a functional group that can polymerize with the cross-linker used in the polymerizing step, there is a possibility that the target molecule is incorporated undesirably in the polymer in the polymerizing step. This needs to be avoided. For example, due to the presence of a vinyl group, the cinchonidine used as the target molecule (described later in Examples) may be incorporated in the polymer. In order to avoid this, the present invention includes the target molecule reducing step of reducing the vinyl group, to be performed before the complex synthesizing step. By providing the target molecule reducing step, the target molecule will not be incorporated in the polymer.

The following will describe the present invention in detail by way of an Example. It should be appreciated that the present invention is not limited in any way by the following description.

Example

Figure 2:
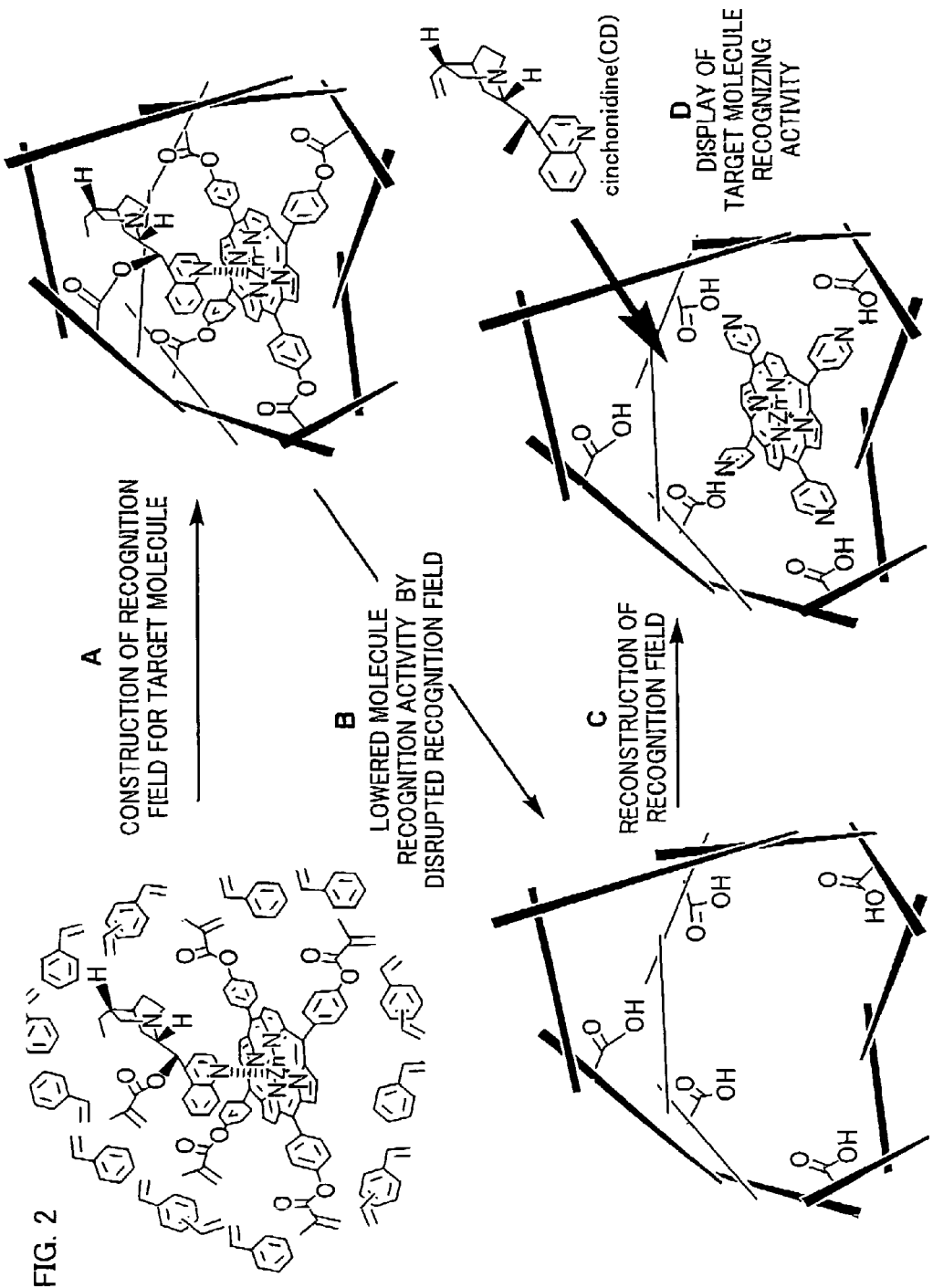
FIG. 2 is a diagram schematically showing a procedure for producing a molecular recognition polymer according to an example of the present invention.

An imprinted polymer was synthesized that had a reconstructable recognition field for the target molecule. As the target molecule, cinchonidine (hereinafter referred to as "CD"), which is one kind of alkaloid, was used. Methacrylic acid was used as the molecule (a) that specifically and reversibly binds to the target molecule, and a porphyrin-zinc complex was used as the molecule (b) that interacts with the target molecule. As shown in FIG. 1, CD is in axial position with the porphyrin-zinc complex. FIG. 2 shows the design of the molecular recognition polymer. Specifically, the binding site was designed to have two interactions: the axial bonding with the porphyrin-zinc complex; and the hydrogen bonding with the methacrylic acid. The recognition field for CD was synthesized by the molecular imprinting method (A). Then, the target molecule CD, and one of the recognition sites, porphyrin-zinc complex, were excised from the system, in order to destroy the recognition field and reduce the molecular recognition activity (B). This was followed by reintroduction of the porphyrin-zinc complex into the system, so as to reconstruct the target-molecule recognition field (C) and exhibit the CD molecule recognition activity (D). The following specifically describes how the imprinted polymer is synthesized, and how the polymer reconstructs the recognition field.

1. Synthesis of CD-Recognizing Imprinted Polymer 1-1. Forming CD Derivative

Figure 3:
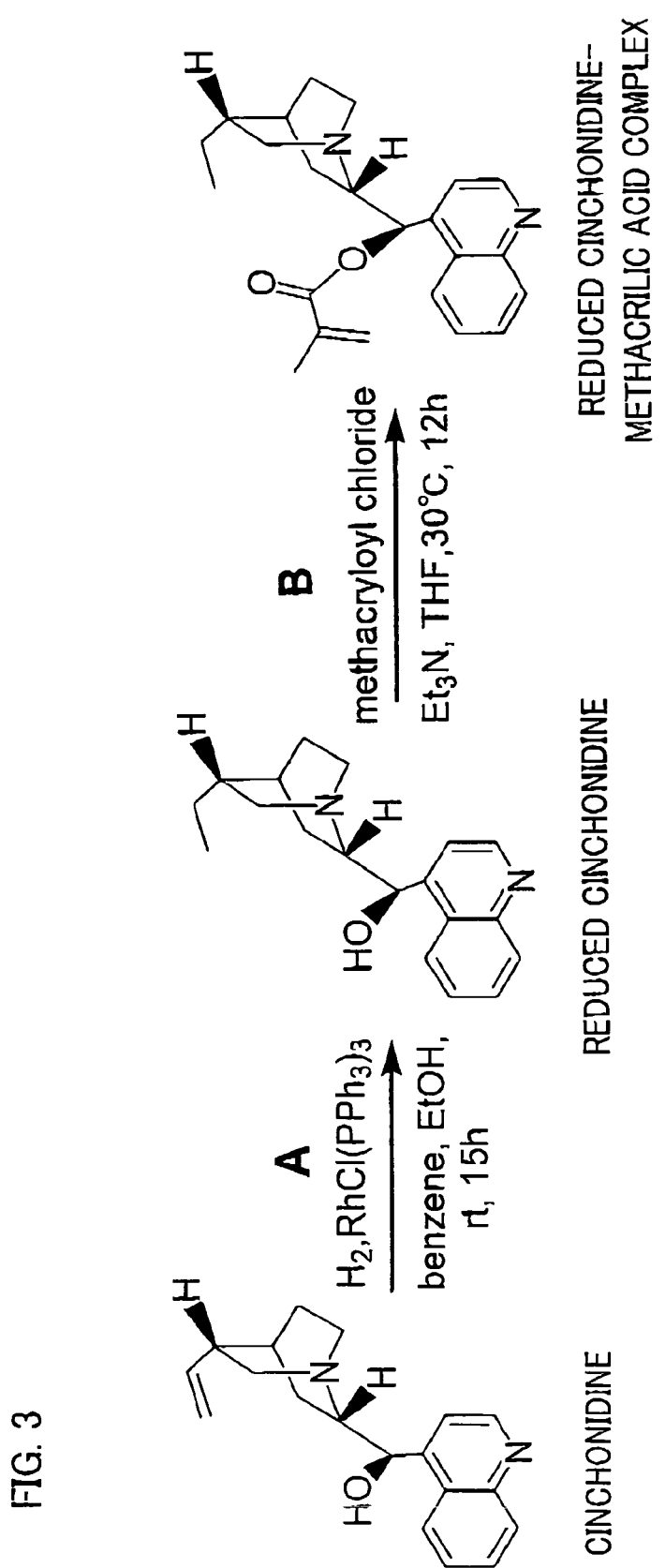
FIG. 3 is a diagram schematizing formation of a cinchonidine derivative.

FIG. 3 shows a scheme for forming a CD derivative. As shown in FIG. 3A, the vinyl group of CD was reduced first, and a complex with methacrylic acid was synthesized (metacryloylation), as shown in FIG. 3B. The reduction of the CD vinyl group is performed to prevent it from being incorporated into the polymer during polymerization.

(1) Catalytic Reduction of CD

First, 1.06 g of CD was dissolved in ethanol/benzene=10/3 ml. The solution was then supplemented with 50.78 mg of Wilkinson catalyst and was replaced with hydrogen by being stirred for 15 hours at room temperature. The solution, which was a transparent yellow liquid before the reaction, formed white precipitates during the stirring process performed under hydrogen. This was considered to be due to the reduction of the vinyl group, which presumably lowered the solubility. The reaction was tracked by mass spectroscopy. It was found that the source peak (295.3) decreased with time, and, after 15 hours, a peak with the additional molecular weight of 2 substantially matched the peak of the product. The reaction was stopped at this stage and the solvent was removed. Purifying with an alumina column (chloroform/methanol=50/1) yielded 650 mg of white powder. By 1H NMR, this was confirmed to be CD with the reduced vinyl group. The yield was 60.8%.

(2) Synthesis of a Complex of Reduced CD and Methacrylic Acid (Metacryloylation)

First, 249.75 mg of reduced CD was dissolved in 100 ml of tetrahydrofuran (THF). The solution was then supplemented with 0.35 ml of triethylamine (Et3N) and 0.16 ml of methacryloyl chloride, and was stirred for 12 hours at 30° C. After extraction with chloroform, the solvent was removed and the product was isolated with alumina column (chloroform). As a result, 85 mg of viscous solid was obtained. By NMR, this was confirmed to be the methacryloyl reduced CD. The yield was 27.8%.

1-2. Formation of Porphyrin Derivative

Figure 4:
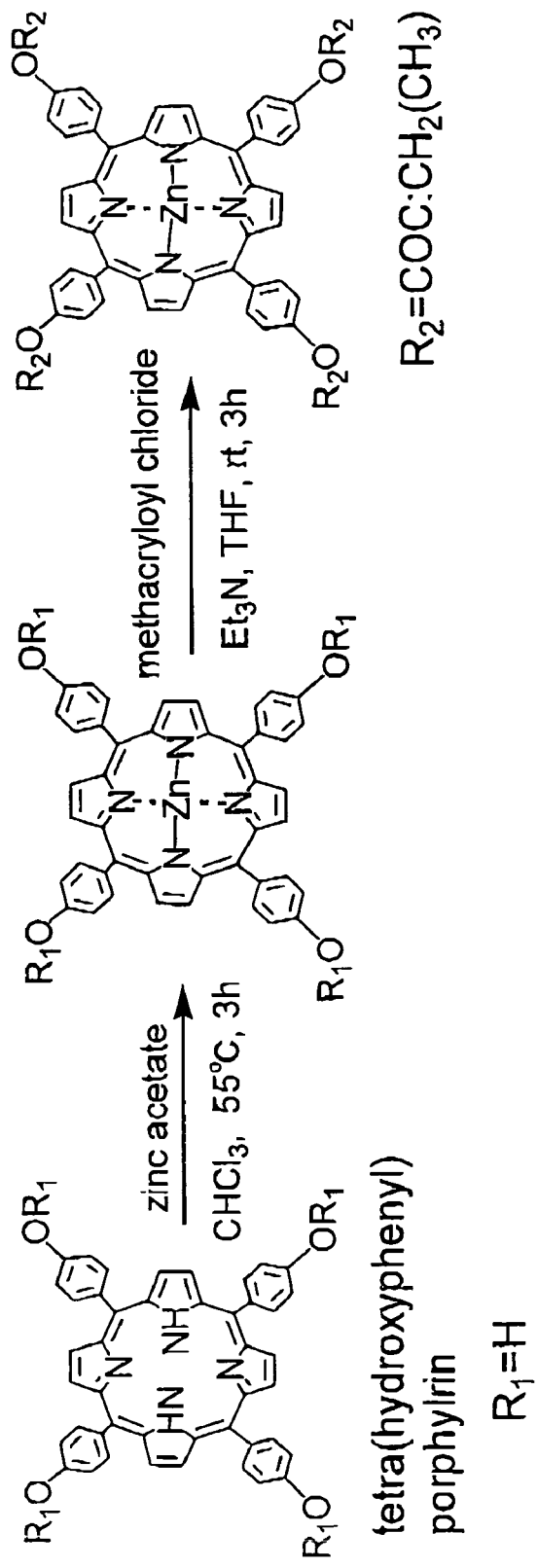
FIG. 4 is a diagram schematizing formation of a porphyrin derivative.

FIG. 4 shows a scheme for forming a porphyrin derivative. As shown in FIG. 4, a zinc complex of tetra(hydroxyphenyl) porphyrin was formed first, which was then used for the synthesis of a complex with methacrylic acid (metacryloylation).

1-3 Synthesis of CD Imprinted Polymer (Construction of Recognition Field)

Using the CD derivative and the porphyrin derivative, an imprinted polymer was synthesized according to the recipe shown in Table 1, and the recognition field was constructed. As used in Table 1, the CD derivative is the reduced CD-methacrylic acid complex shown on the right side of FIG. 3, and the porphyrin derivative is the complex of porphyrin-zinc complex and methacrylic acid shown on the right side of FIG. 4. Everything except the initiator was mixed in a small vial and was freeze-dried. Then, the vial was sealed to allow for radical polymerization for 15 hours at 70° C. As a result, a hard but easily crushable polymer, dark purple in color, was obtained. The polymer was crushed in a mortar.

TABLE 1

| | | |
|---|---|---|
| TARGET MOLECULE-FUNCTIONAL MONOMER COMPLEX | CINCHONIDINE DERIVATIVE | 0.02 mmol (7.25 mg) |
| EXCISABLE FUNCTIONAL MONOMER | PORPHYRIN DERIVATIVE | 0.02 mmol (20.29 mg) |
| CROSS-LINKER | DIVINYL BENZENE | 0.50 mmol (70 µL) |
| | STYRENE | 1.50 mmol (1.75 µL) |
| INITIATOR | ADVN* | 0.04 mmol (8.94 mg) |
| SOLVENT | BENZENE | 500 µL |

*2,2'-AZOBIS(2,4-DIMETHYL VALERONITRILE)

2. Reconstruction of Recognition Field 2-1. Excision of Porphyrin (Destruction of Recognition Field)

The molecular recognition activity was disrupted by excising the porphyrin and CD. The crushed polymer was refluxed for 48 hours in a 25 ml methanol solution of 2.0 M sodium hydroxide to perform a hydrolysis reaction. The solution was supplemented with HCl and was stirred for 1 hour. After filtration, the product was washed for 24 hours with Soxhlet (methanol/chloroform=130/50 ml).

2-2. Rebinding of Porphyrin (Reconstruction of Recognition Field)

The molecular recognition field was reconstructed by rebinding porphyrin-zinc complex. The dried polymer was placed in a ZnTPyP solution (solvent: chloroform spectroscopy grade), and the solution was stirred for 4 hours at room temperature. The solution was then filtered with a syringe filter to separate the polymer from the solution, and the adsorption of ZnTPyP was estimated from changes in absorbance of the filtrate. The polymer was picked up from the filter and dried.

Figure 5:
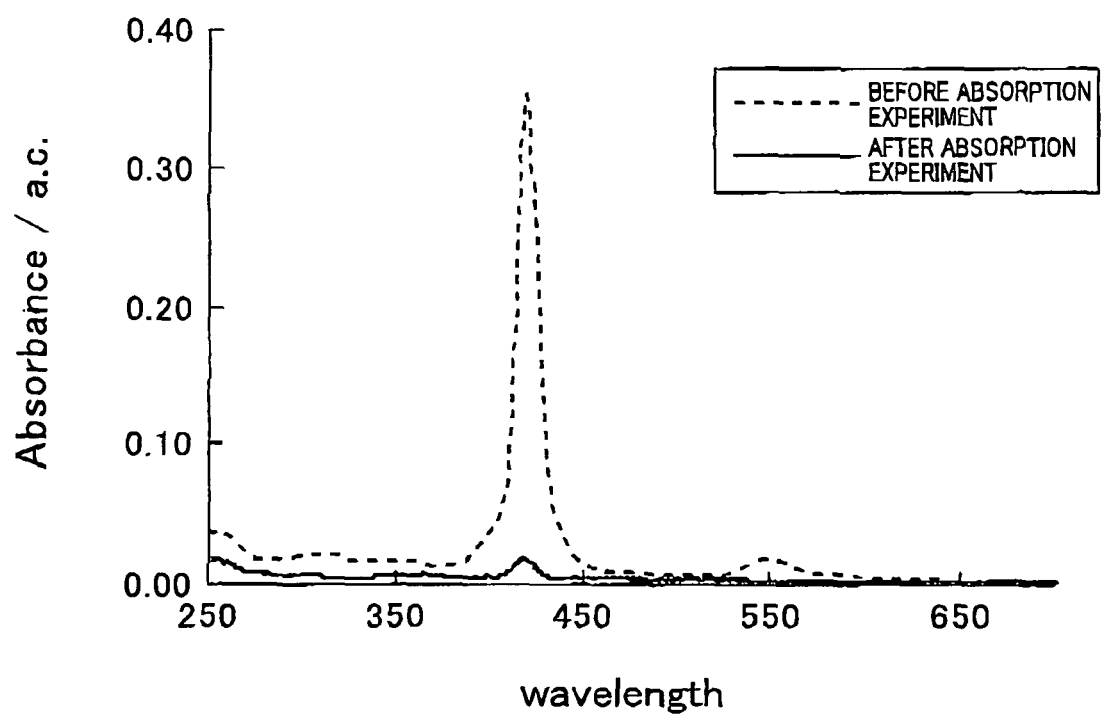
FIG. 5 is a graph representing UV spectra of a ZnTPyP solution used in a rebinding experiment of porphyrin.

FIG. 5 shows the UV spectra of the ZnTPyP solution. Table 2 represents adsorptions of ZnTPyP calculated from the UV spectrum. In Table 2, IP-a and IP-b represent polymers from different batches. The adsorptions shown in Table 2 were calculated from the absorbance at 419 nm shown in FIG. 5. The result showed that the CD recognition field was indeed reconstructed by the formation of hydrogen bonds between the pyridine moieties linked to the meso positions of porphyrin and the four carboxyl groups in the binding site generated by hydrolysis.

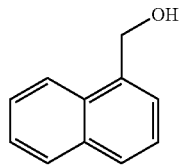

[Chemical Formula 6]

Table 3 represents adsorptions for the reconstructed polymer. The adsorptions were calculated from the absorbance at 285 nm. The quinoline and benzyl alcohol used as reference compounds have only one interacting site for the recognition field, therefore, these two compounds were not adsorbed by the receptors. The negative sign on the adsorptions can be explained by the adsorption of the cross-linker that was released into benzene, or by the adsorption of part of porphyrin that was released in benzene. The results therefore confirmed that the polymer can strongly recognize the target molecule CD by two interactions: hydrogen bonding with the methacrylic acid residue, and the axial bonding with the porphyrin-zinc complex.

TABLE 2

| | CONCENTRATION OF ZnTPyP SOLUTION (μM) | VOLUME (mL) | AMOUNT OF POLYMER (mg) | FINAL VOLUME OF FILTRATE (mL) | ADSORPTION (μM/g-polymer) |
|---|---|---|---|---|---|
| IP-a | 20 | 16 | 100 | 20 | 3.31 |
| IP-b | 30 | 8 | 50 | 8 | 4.42 |

3. Confirmation of Recognition Field Accuracy 3-1. Comparison of Adsorptions Using Reference Compounds In order to confirm accuracy of the reconstructed recognition field, adsorptions were compared using CD (Chemical Formula 4), quinoline (Chemical Formula 5), and benzyl alcohol (Chemical Formula 6). Specifically, 10 mg of the polymer that has reconstructed the recognition field by adsorbing porphyrin was stirred for 4 hours at room temperature in 1 ml of each 30 μM solution (benzene spectroscopy grade). The solution was then filtered with a syringe filter to separate the polymer from the solution, and the adsorption for the polymer was determined from changes in absorbance of the filtrate.

TABLE 3

| | ADSORPTION (μmol/g-polymer) |
|---|---|
| CINCHONIDINE | 0.56 |
| QUINOLINE | −1.02 |
| BENZYL ALCOHOL | −0.89 |

3-2. Comparison of Adsorptions Using Cinchonine

The accuracy of the reconstructed recognition field was confirmed by comparing adsorptions of CD and cinchonine (hereinafter simply "CN", Chemical Formula 7), which is a diastereomer of CD. Specifically, 10 mg of the polymer that has reconstructed the recognition field by adsorbing porphyrin was stirred for 4 hours at room temperature in 1 ml of each 40 μM solution (benzene spectroscopy grade). The solution was then filtered with a syringe filter to separate the polymer from the solution, and the adsorption for the polymer was determined from changes in absorbance of the filtrate.

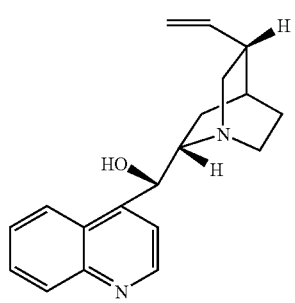

[Chemical Formula 4]

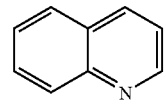

[Chemical Formula 5]

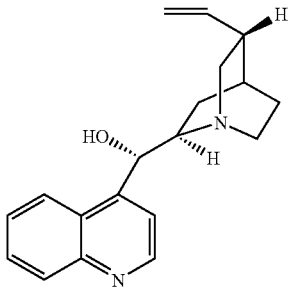

[Chemical Formula 7]

Figure 6:
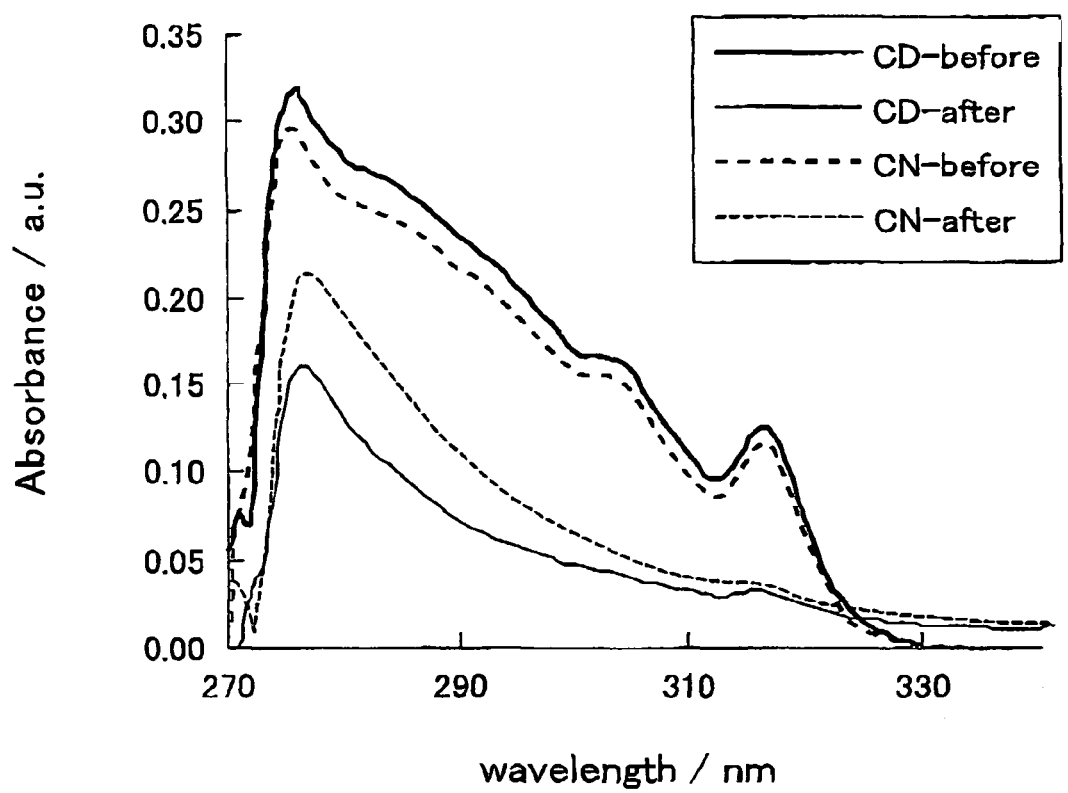
FIG. 6 is a graph representing UV spectra of a CD solution and a CN solution used in an adsorption comparison experiments using cinchonine.

FIG. 6 shows the UV spectra of the stirred solutions. Table 4 represents adsorptions of CD and CN for the reconstructed polymer that has reabsorbed porphyrin. The adsorptions were estimated from the absorbance at 285 nm. As can be seen in Table 4, the CN had a smaller adsorption than the counterpart CD. This suggests that the reconstruction accuracy of the recognition site in the polymer was accurate enough to recognize even its diastereomer. The foregoing result therefore confirmed not just that the reconstructed recognition field had adsorbed CD by hydrogen bonding and axial bonding but the reconstructed recognition field had a specific three-dimensional conformation.

TABLE 4

| ADSORPTION (μmol/g-polymer) | | SEPARATION |
| --- | --- | --- |
| CD | CN | FACTOR α (CD/CN) |
| 2.39 | 1.41 | 1.70 |

4. Designing and Synthesis of Blank Polymer

The following blank polymers (hereinafter "BP") were designed.

BP1: A Polymer with no CD imprinting. By the absence of the CD recognition field, BP1 can be used to evaluate the template effect by comparing it with the CD imprinted polymer.

BP2: A polymer that recognizes CD only with methacrylic acid but not with porphyrin.

BP3: A polymer of a CD non-covalent bonding type, used for comparison with a polymer of a covalent bonding type.

The blank polymers were synthesized according to the recipe shown in FIG. 5. Everything except the initiator was mixed together and freeze-dried. Then, the initiator was added to allow for radical polymerization at 70° C. BP1 and BP3 were crushed first and washed in Soxhlet (methanol/chloroform=3/1, 24 hours) and benzene (45 ml, 4 hours). BP2 was refluxed in a 25 ml solution of 2.0 M sodium hydroxide to perform hydrolysis for 24 hours. This was followed by washing in Soxhlet (methanol/chloroform=3/1, 24 hours) and benzene (4 hours), as for BP1 and BP3.

TABLE 5

|  |  | BP1 | BP2 | BP3 |
| --- | --- | --- | --- | --- |
| TARGET MOLECULE-FUNCTIONAL MONOMER COMPLEX | CINCHONIDINE DERIVATIVE | — | 0.02 mmol (7.25 mg) | — |
| TARGET MOLECULE | CINCHONIDINE | — | — | 0.02 mmol (5.98 mg) |
| FUNCTIONAL MONOMER | METHACRYLIC ACID | — | — | 0.02 mmol (2 μL) |
| EXCISABLE FUNCTIONAL MONOMER | PORPHYRIN COMPLEX | 0.02 mmol (20.29 mg) | — | 0.02 mmol |
| CROSS-LINKER | DIVINYL BENZENE STYRENE | | 0.50 mmol (70 μL) 1.50 mmol (1.75 μL) | |
| INITIATOR | ADVN* | | 0.04 mmol (8.94 mg) | |
| SOLVENT | BENZENE | | 500 μL | |

*2,2'-AZOBIS(2,4-DIMETHYL VALERONITRILE)

5. Comparison of CD Adsorptions Using Blank Polymers

For each of the porphyrin-bound imprinted polymer (IP(P)), the porphyrin-unbound imprinted polymer (IP(−)), and the blank polymers (BPs), 10 mg of the polymer was stirred for 4 hours in a 1 ml CD solution (28.2 μM, benzene spectroscopy grade). The solution was then filtered to separate the polymer from the solution, and the CD adsorption for the polymer was determined from changes in absorbance of the solution.

Table 6 shows the results. As is clear from Table 6, owning to the fact that porphyrins are not excised, BP1 (no CD imprinting) had more porphyrins in the polymer than IP(P), suggesting that non-specific adsorption of CD was observed. The CD non-covalent bonding type polymer BP3 had adsorbed substantially the same amount of CD as did BP1, suggesting the non-specific adsorption of CD as for BP1. The BP2 that had a recognition site solely constructed of methacrylic acid bound to more CDs than did IP(P), but the amount of CD was smaller compared with BP1 and BP2. This is believed to be the result of CD imprinting, and the suppressed level of non-specific adsorption as compared with the other BPs. The difference in CD adsorption due to the presence or absence of porphyrin was slight between IP(P) and IP(−). This can be explained by the fact that IP(−) had more methacrylic acid residues than IP(P) due to the excision of both porphyrin and CD, but, owning to the large space created by the excision, could not retain CD in the polymer, with the result that it had less adsorption than the IPs that had adsorbed porphyrins.

TABLE 6

|  | BINDING (μmol/g-polymer) | SELECTIVE RATIO IP(P)-b/BP |
| --- | --- | --- |
| IP(P) | 1.08 | 1.00 |
| IP(—) | 0.99 | 0.92 |
| BP1 | 2.58 | 2.38 |
| BP2 | 1.82 | 1.68 |
| BP3 | 2.45 | 2.26 |

The foregoing results showed that the molecular recognition polymer synthesized in the Example had a three-dimensional space formed by the porphyrin and methacrylic acid complementary to the target molecule CD, and that the polymer exhibits its activity (molecular recognition) only in the presence of plural molecules. Further, comparison of adsorptions using diastereomer revealed that the molecular recognition activity was reconstructable, and that the polymer was able to accurately retain the molecular recognition activity even after it is reconstructed.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

In a molecular recognition polymer according to the present invention, a molecule (b) that interacts with the target molecule is detachable or replaceable. This enables the recognition field of the target molecule to be reconstructed. Further, with a molecule that exhibits a signaling capability by interacting with the target molecule, the signaling part can be replaced without changing the binding site for the target molecule. In this way, many different functions can be realized from a single material. Further, the signaling part can be replaced and repaired even when it is degraded.

A molecular recognition polymer according to the present invention can binds to the target molecule when the target molecule coexists with the molecule (b) that interacts with the target molecule. This can be used for the analysis of interactions between molecules. The present invention is therefore applicable to the analysis of complex interactions between bio-molecules.

The present invention can be used to recognize or capture a wide diversity of molecules. Thus, when used for biomolecules or drugs for example, the applicable field of the present invention will include not only medicine, clinical examination and the like, but basic research in medicine or biology. When used for environmentally harmful substances, the present invention will be widely applicable to forestry, fishery, and a wide range of manufacturing industries in general.

The invention claimed is:

1. A molecular recognition polymer comprising:
    a segment obtained by polymerization of a molecule (a) that is specifically and reversibly bound to a target molecule with a polymerizing agent selected from compounds having at least one vinyl group or at least one methacryloyl group and
    a porphyrin-zinc complex that interacts with the target molecule,
    wherein the molecular recognition polymer includes a target-molecule recognition field complementary to the target molecule,
    wherein the porphyrin-zinc complex that interacts with the target molecule is detachable or replaceable, and
    wherein the molecule (a) that specifically and reversibly binds to the target molecule has a functional group for forming a covalent bond that specifically and reversibly binds to the target molecule and a polymerizable functional group that can polymerize with the polymerizing agent.

2. A molecular recognition polymer as set forth in claim 1, wherein the porphyrin-zinc complex that interacts with the target molecule exhibits a signalling capability by interacting with the target molecule.

3. A molecular recognition polymer as set forth in claim 1, which binds to the target molecule when the target molecule coexists with the porphyrin-zinc complex that interacts with the target molecule.

4. A molecular recognition polymer as set forth in claim 1, wherein at least one of the target molecule and the porphyrin-zinc complex that interacts with the target molecule is a bio-molecule.

5. A method for producing a molecular recognition polymer of claim 1, said method comprising:
    a complex synthesizing step of complexing the target molecule with the molecule (a) to form a covalent complex, wherein the molecule (a) has the functional group that specifically and reversibly binds to the target molecule and the polymerizable functional group that can polymerize with the polymerizing agent;
    a polymerizing step of forming a polymer by co-polymerizing the covalent complex with the polymerizing agent selected from compounds having the at least one vinyl group or the at least one methacryloyl group and the porphyrin-zinc complex that interacts with the target molecule; and
    a detaching step of detaching, from the polymer, the target molecule and the porphyrin-zinc complex that interacts with the target molecule.

6. A molecular recognition polymer as set forth in claim 2, wherein the molecular recognition polymer binds to the target molecule when the target molecule coexists with the porphyrin-zinc complex that interacts with the target molecule.

7. A molecular recognition polymer as set forth in claim 1, wherein the molecular recognition polymer binds to the target molecule when the target molecule coexists with the porphyrin-zinc complex that interacts with the target molecule.

8. A molecular recognition polymer as set forth in claim 2, wherein at least one of the target molecule and the porphyrin-zinc complex that interacts with the target molecule is a bio-molecule.

9. A molecular recognition polymer as set forth in claim 1, wherein at least one of the target molecule and the porphyrin-zinc complex that interacts with the target molecule is a bio-molecule.

10. A molecular recognition polymer as set forth in claim 3, wherein at least one of the target molecule and the porphyrin-zinc complex that interacts with the target molecule is a bio-molecule.

* * * * *